I. ROSENBERG.
COMBINATION VALVE GRINDER AND BREAST DRILL.
APPLICATION FILED JUNE 23, 1919.

1,352,476. Patented Sept. 14, 1920.

WITNESS
Louis J. La Forest

INVENTOR
Isadore Rosenberg
By A. M. Wooster ATTORNEY

UNITED STATES PATENT OFFICE.

ISADORE ROSENBERG, OF PORT CHESTER, NEW YORK.

COMBINATION VALVE-GRINDER AND BREAST-DRILL.

1,352,476.  Specification of Letters Patent.  Patented Sept. 14, 1920.

Application filed June 23, 1919. Serial No. 306,129.

*To all whom it may concern:*

Be it known that I, ISADORE ROSENBERG, a citizen of the United States, residing at Port Chester, county of Westchester, State of New York, have invented an Improvement in Combination Valve-Grinders and Breast-Drills, of which the following is a specification.

This invention has for its object to provide an improved tool stock having manual operating means adapted to impart either rotary or oscillatory motion to a tool or the like, and especially, although not exclusively, to provide a simple and inexpensive device which may be arranged for use as either a breast drill or a valve grinder.

The foregoing and other objects of the invention, together with means whereby the same may be carried into effect, will best be understood from the following description of one form or embodiment thereof illustrated in the accompanying drawings, in which.

Figure 1:
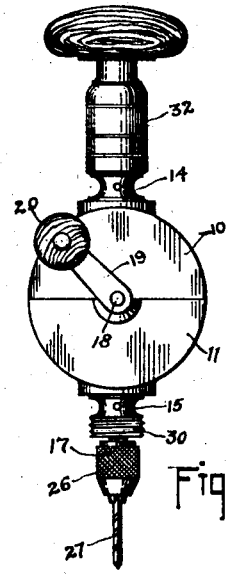
Figure 1 is a side elevation of the device, showing the same arranged for use as a breast drill.

As herein shown, the device comprises a flat cylindrical body or casing divided diametrically into upper and lower sections 10 and 11 respectively, said sections being connected by suitable latches or retaining devices 12 which may be of any well-known form. The sections 10 and 11 are formed with upper and lower radial projections 14 and 15 constituting bearings for alined oppositely extending tool operating spindles 16 and 17. The meeting edges of the casing sections 10 and 11 are formed to provide bearings for a transverse shaft 18 having at one end outside the casing an operating crank 19 provided with a handle 20, said shaft and crank constituting the actuator of the device. Fast on the shaft 18 within the casing is a crown or bevel gear 21 which meshes with a bevel pinion 22 carried by the spindle 17, whereby operation of the crank 19 will cause rotary motion of said spindle 17. Secured to or formed integral with the gear 21 is a cam 23 which coöperates with an angular arm 24 fast on the spindle 16, said arm being held in engagement with said cam by a spring 25 connecting the same with the wall of the casing section 10. By the foregoing connections, it will be seen that rotation of the shaft 18 by the crank 19 will result in oscillation of the shaft or spindle 16 through an arc corresponding to the rise of the cam 23.

The shaft or spindle 17 is provided outside the casing with a chuck 26 for holding a drill 27, while the shaft or spindle 16 carries at its outer end a valve grinding implement 28 having projections 29 to engage the sockets or slot in a valve for the purpose of grinding the same upon its seat. The valve grinding implement 28 is preferably magnetized in order to facilitate the lifting of the valve from its seat for the insertion between said valve and seat of the usual abrasive material. The projections 14 and 15 are threaded to constitute nipples 30 and 31 to either of which may be detachably connected a pressure handle 32 having a hollow shank to receive the grinding tool 28 or the drill chuck 26 as the case may be.

Figure 2:
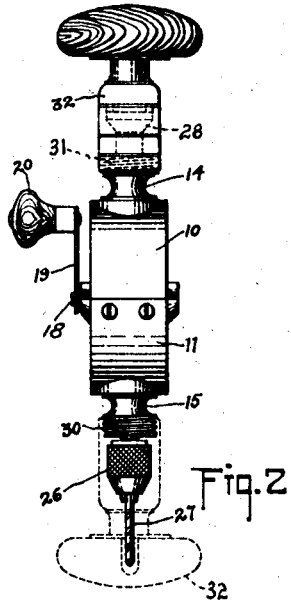
Fig. 2 is an elevation at right angles to Fig. 1, showing in dotted lines the position of the pressure handle when the device is used as a valve grinder.
Figure 3:
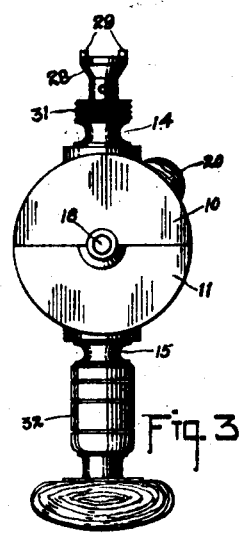
Fig. 3 is a side elevation showing the device arranged for use as a valve grinder.
Figure 4:
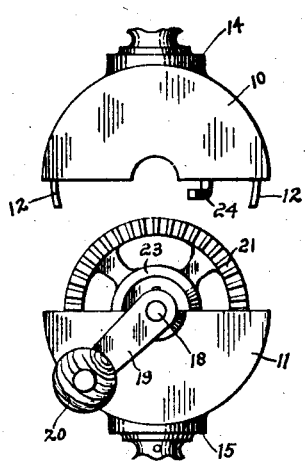
Fig. 4 is an elevation, partly broken away, showing the casing parts separated.
Figure 5:
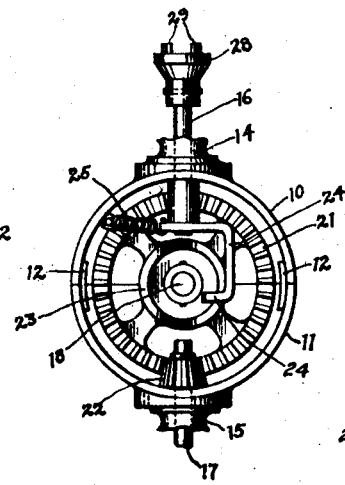
Figs. 5 and 6 are longitudinal sections, on planes at right angles to one another, of the casing and operating mechanism.
Figure 6:
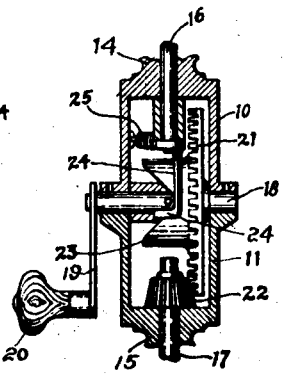

The use of the device will be obvious from the foregoing description. For use as a breast drill, the pressure handle 32 is placed over the valve grinding implement 28 and engaged with the nipple 31 as shown in Fig. 1 and in full lines in Fig. 2, thereby rendering operative the spindle 17 and permitting the device to be used in the usual manner as a breast drill, rotation of the crank 19 by the handle 20 causing rotation, at an increased speed, of the chuck 26 and drill 27. When it is desired to use the device as a valve grinder, the pressure handle 32 is removed from the nipple 31 and attached to the nipple 30 over the drill chuck 26, as shown in Fig. 3 and in dotted lines in Fig. 2, thereby rendering accessible the valve grinding implement 28, to which oscillation may be imparted by rotation of the crank 19.

It will be seen that the entire device is very simple, light, and compact and may be readily carried in an automobile or other tool kit, and that the same may be conveniently employed for a variety of useful purposes.

Having thus described my invention, I claim:

1. A device of the character described comprising a rotary actuator, a pair of spaced apart tool holding members, and means for transmitting rotary movement from said actuator to one of said members and for converting the rotary movement of said actuator into oscillatory movement of the other of said members.

2. A device of the character described comprising a rotary actuator, a drill chuck, a valve grinding implement spaced therefrom and means for transmitting rotary movement from said actuator to said drill chuck and for simultaneously converting the rotary movement of said actuator into oscillatory movement of said valve grinding implement.

3. A device of the character described comprising a rotary shaft, a pair of spaced apart tool holding members, and means on said shaft for imparting rotary movement to one of said members and for imparting oscillatory movement to the other of said members.

4. A device of the character described comprising a rotary shaft, a pair of spaced apart tool holding members, gearing connecting said shaft with one of said members, a cam on said shaft, and means operated by said cam for oscillating the other of said members.

5. A device of the character described comprising a rotary shaft, a pair of spaced apart tool holding members, gearing connecting said shaft with one of said members, a cam on said shaft, an arm on the other of said members engaging said cam, and a spring for holding said arm in engagement with said cam.

6. A device of the character described comprising a rotary shaft, a pair of oppositely extending tool carrying spindles, intermeshing gears on said shaft and one of said spindles, and a cam on said shaft for oscillating the other of said spindles.

7. A device of the character described comprising a rotary shaft, a pair of oppositely extending spindles, a drill chuck carried by one of said spindles, a valve grinding implement carried by the other of said spindles, intermeshing gears on said shaft and said first named spindle, and a cam on said shaft for oscillating the other of said spindles.

8. A device of the character described comprising a body, a rotary actuator carried thereby, a pair of tool operating members carried by said body, means for transmitting rotary movement from said actuator to one of said members and for converting the rotary movement of said actuator into oscillatory movement of the other of said members, and a handle adapted for attachment to said body in either of two positions to render operative said members respectively.

9. A device of the character described comprising a body, a pair of oppositely disposed tool operating members carried thereby, operating means for said members carried by said body, a handle, and means for attaching said handle to said body adjacent either of said members to render operative the other of said members.

10. A device of the character described comprising a casing having a pair of oppositely extended nipples, tool operating spindles journaled in said nipples respectively, operating means for said spindles in said casing, and a hollow handle adapted for attachment to either of said nipples.

11. A device of the character described comprising a casing having a pair of oppositely extended nipples, spindles journaled in said nipples respectively, a drill chuck carried by one of said spindles, a valve grinding implement carried by the other of said spindles, intermeshing gears on said shaft and said first named spindle, a cam on said shaft for oscillating the other of said spindles, and a hollow handle adapted for attachment to either of said nipples over said drill chuck or over said valve grinding implement.

12. A device of the character described comprising a body, a rotary actuator carried thereby, a pair of tool operating spindles carried by said body, a drill chuck carried by one of said spindles, a magnetized valve grinding implement carried by the other of said spindles, and means for transmitting rotary movement from said actuator to said first named spindle and for converting the rotary movement of said actuator into oscillatory movement of the other of said spindles.

In testimony whereof I affix my signature.

ISADORE ROSENBERG.